Dec. 10, 1946.   H. SCHRECK   2,412,361
CONTROL OF FUEL INTRODUCTION TO ENGINE CYLINDER
Filed Jan. 13, 1944
FIG. 1.
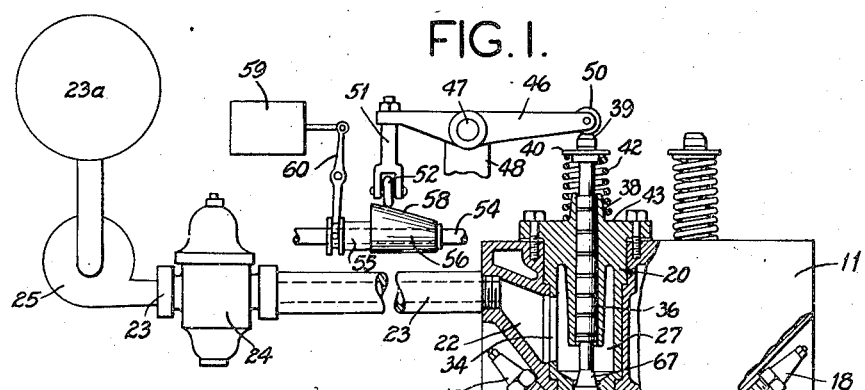
FIG. 2.
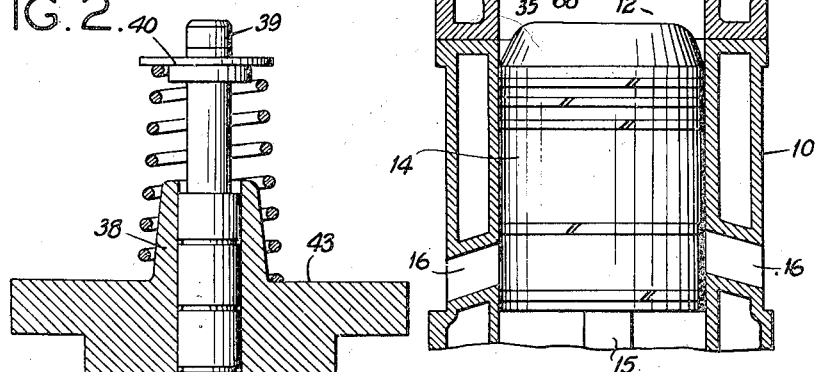
FIG. 3.
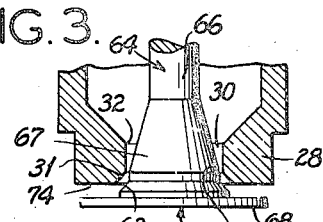
FIG. 4.
FIG. 5.
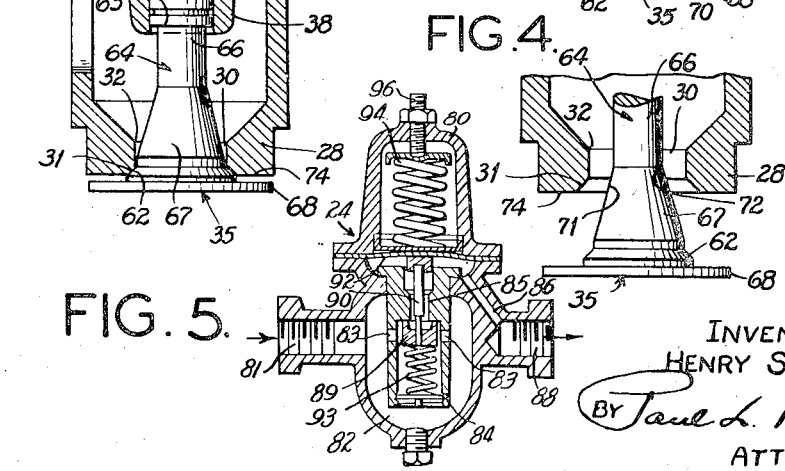
INVENTOR:
HENRY SCHRECK
BY Paul L. Kirke
ATTORNEY Patented Dec. 10, 1946

2,412,361

UNITED STATES PATENT OFFICE 2,412,361

CONTROL OF FUEL INTRODUCTION TO ENGINE CYLINDERS

Henry Schreck, Beloit, Wis., assignor to Fairbanks, Morse & Co., Chicago, Ill., a corporation of Illinois Application January 13, 1944, Serial No. 518,041

16 Claims. (Cl. 123—65)

This invention relates generally to control of fuel introduction to cylinders of internal combustion engines and the like, and has particular reference to improved valve mechanism for controlling fuel admission to engine cylinders, and to a method of cylinder fuel admission which affords more efficient and effective fuel combustion in the cylinder, with attendant improvement in engine operating efficiency. The control valve means for and method of cylinder fuel introduction as provided by the present improvements, while applicable generally to fluid or gas operated engines, is especially suitable for engines adapted to operate on true gaseous fuels, such as an engine of the character fully disclosed and claimed in a copending application for Gas engines, filed by this applicant July 11, 1941, and bearing Serial No. 401,884.

Objectively, the present developments present an improved method of and means for introducing fuel to an engine cylinder such as to result in dependable combustion or regularity of firing throughout the full load range of the engine, the method proposing the maintenance of a relatively constant pressure of the fuel available to the cylinder for timed admission in metered quantity thereto, and so admitting to and distributing the fuel within the cylinder as to form a stratum thereof across the combustion space and in the immediate region of incipient ignition in the cylinder.

The invention further has as an important object, the provision of an improved valve assembly suitable for cylinder fuel admission control, which is adapted for regulating or metering the fuel charge admitted to the cylinder, in accordance with the extent of valve operation as may be determined by engine speed and load conditions, and which is adapted additionally, for controlling fuel delivery into the cylinder such as to establish therein a fuel stratum extending across the cylinder combustion space and in the region of incipient ignition therein. In a preferred embodiment as hereinafter fully described, the improved valve mechanism includes a displaceable control member or valve head of improved construction, and a cooperating valve passage and port opening, adapted to control fuel delivery to the cylinder such as to admit a fuel charge thereto in proportioned or metered quantity determined by and in accordance with the extent of valve head displacement and duration of valve opening, with the latter effected by preference, as a function of engine speed and load.

Another object resides in the provision of a control valve of the character aforesaid, in a cylinder assembly providing fuel igniting means predetermined as to location relative to the cylinder combustion space, wherein the displaceable valve head structure incorporates as an important feature thereof, a fuel deflector or cap element which becomes effective in any open or fuel-admitting position of the valve, to deflect and direct the incoming fuel into the cylinder combustion space such as to establish a fuel stratum therein, extending to the zone or zones of the fuel igniting means.

Further objects and advantages attained by the present improvements will become apparent from the following description of a preferred embodiment of the invention as exemplified in the accompanying drawing, wherein:

Fig. 1 is a fragmentary vertical section of the upper portion of an engine cylinder and a portion of the cylinder head, illustrating features of the invention, the view including a cylinder fuel supply line having embodied therein a fuel-pressure control device shown only in assembly elevation, and including additionally and as illustrated diagrammatically only, valve-actuator means under engine governor control;

Fig. 2 is a sectional elevation longitudinally of a fuel control valve embodying features of the present invention, and as adapted for cylinder-head mounting for fuel admission control relative to the cylinder combustion space;

Fig. 3 is an enlarged fragmentary section of the valve shown by Fig. 2, illustrating the port controlling valve head in an initial or partly open position;

Fig. 4 is a similar fragmentary section, showing the valve head displaced to a greater extent in the port-opening direction, and Fig. 5 is a sectional view of a fuel pressure control device employed in the fuel line to the engine cylinder.

Referring to the drawing by appropriate characters of reference, Fig. 1 illustrates in fragmentary vertical section, the upper portion 10 of an engine cylinder and a cylinder head structure 11, these defining a combustion space 12 within which operates a piston 14 which may be of usual construction, the piston being suitably operatively connected through a connecting rod shown only in part at 15, with the engine crankshaft (not shown). Exhaust or eduction means such as ports 16, may be provided in the cylinder as shown, for the discharge of the products of combustion, the ports being arranged to be opened and closed by the piston 14. The foregoing elements may, for the purposes of the present disclosure, be considered as parts of a gas engine of two-cycle type, and of the general form and construction shown in the application above referred to, bearing Serial No. 401,884.

Ignition means such as spark plugs 18 or the like, are mounted in the cylinder head section 11, there being two plugs shown in the present example, although it is to be understood that one or more may be employed as may be desired or required in a given engine. According to the present disclosure and for a purpose later to appear, the location of the ignition element or elements 18 in the cylinder head preferably is such that the fuel igniting or spark terminals thereof are exposed substantially in the uppermost zone of the combustion space 12 or relatively near the cylinder head wall 19.

The presently improved fuel admission valve, designated generally in Fig. 1 by the reference numeral 20, the features and construction of which will appear presently in the description of Figs. 2 to 4, is arranged in the cylinder head 11 substantially as shown, to control fuel delivery to the combustion space 12. A cylinder head passage 22 serves to connect the valve with a fuel supply conduit 23 extending to a suitable source of fuel indicated diagrammatically at 23a, which may be a fuel tank or the like. Included in the fuel line or conduit 23 is a pressure control device 24 of a character functioning to maintain within narrow limits and irrespective of usual or normally encountered pressure fluctuation at the fuel source, a relatively constant pressure of the fuel delivered therefrom to the engine fuel valve 20. The device 24 which may be of any suitable or well known type, by preference is adjustable to afford preselection of the fuel pressure to be maintained thereby, as conditions may dictate in a given engine installation. Normally and necessarily for reasons readily apparent, the fuel pressure selected to be maintained by the device as properly adjusted therefor, must exceed to a predetermined minimum extent, the pressure existing in the cylinder at the time of beginning and throughout fuel admission to the combustion space. Thus through the regulator device 24, there is assured a relatively constant fuel pressure at the engine fuel valve 20, maintained not only independently of pressure fluctuations within normal limits, at the fuel source, but importantly to the present method of cylinder fuel introduction, independently of variations in engine speed and load.

The pressure regulator 24 is shown in section by Fig. 5, according to a well known construction suitable to the present fuel control system. As there illustrated, it includes a casing structure 80 providing an inlet connection 81 to a chamber 82 in the lower portion of the casing. Within chamber 82 is mounted a valve cage or barrel 84 having a fluid passage 85 leading to casing discharge passage 86 and outlet connection 88. Passages or holes 83 in barrel 84, provide fluid communication between chamber 82 and the barrel interior. Controlling the passage 85 is a valve element 89 on a stem 90, the latter being supported by a diaphragm 92 clamped at its margin, between the upper and lower section of the casing 80. A light spring 93 in valve cage 84, serves to bias the valve 89 toward passage-closing position, while a heavier, pressure-control spring 94 bearing between the diaphragm 92 and an adjustable screw abutment 96 threaded in the upper casing section, operates in the direction to open the valve 89. Spring 94 under proper compression adjustment through the threaded abutment 96, normally holds valve 89 in an open position such as to throttle fluid flow through the valve, as to establish a predetermined pressure of the fluid discharging through the outlet connection 88. Assuming by way of example only, that fluid under a pressure of the order of 100 pounds is delivered to the control device, and that a discharge pressure of 40 pounds is desired, the spring 94 is adjusted so that the high pressure fluid passing through the valve and acting against the diaphragm 92, and hence against spring 94, will cause displacement of valve 89 to a throttling position relative to passage 85, such as to reduce the discharge pressure of the fluid to the desired 40 pounds. Any variation in the pressure of fluid supplied to the control valve, will produce a corresponding variation in the pressure-reaction against the diaphragm 92, whereby through the spring 94, the valve element 89 will assume a correspondingly altered throttling position, to regulate fluid discharge such as to maintain the discharge pressure at the desired 40 pounds.

As before indicated, the present developments are particularly suited for application to a gas engine of two-cycle type, and of the character disclosed by my application hereinabove mentioned, Serial No. 401,884, which is intended for operation on a true gaseous fuel as therein defined. Thus for example in the present instance, the fuel employed may be a true gaseous fuel available in mains (not shown) or in a suitable gas receiver indicated at 23a, and delivered to the engine fuel line 23 either directly under the source pressure obtaining in the mains or receiver, if such be sufficient to enable proper functioning of the control valve 24 to establish the desired constant fuel pressure at the engine valve 20, or at a desired pressure determined by suitable pumping means shown diagrammatically at 25, which may be engine driven (not shown) or separately operated, as by an electric motor (not shown). The important consideration with respect to the foregoing, however, is that the fuel available at the engine valve 20 for admission to the engine cylinder, be under pressure of a predetermined value for a given engine assembly, and maintained relatively constant at the given pressure value, for all engine speed and load conditions.

Turning now to the structural assembly and features of the presently improved control valve 20, the valve as best appears from Figs. 2 to 4, includes a valve body or casing 26 formed preferably as shown, to facilitate its location and mounting preferably in the head 11 of the engine cylinder (Fig. 1). The casing forms a fluid- or gas-receiving chamber 27 therein, and extending through the lower or end wall 28 of the body 26, is a passage 30 of a predetermined diameter which is outwardly flared or bevelled in the portion 31 thereof, substantially as illustrated. The portion 31 serves as a valve seat and defines a margin 32 as shown, within the passage 30. The margin 32 thus formed in the passage 30, constitutes for the purpose of the present invention, a port-margin for cooperation with a control element presently to be described, to define the discharge port-opening of the valve. Admission of fluid or gas to the chamber 27 may be effected in any suitable manner, as by an inlet opening 34 in the valve body 26 which when the valve is assembled to the cylinder head 11, registers with the passage 22 therein, leading to the fuel line 23 (Fig. 1).

Projecting through the passage 30 and in operative association therewith, is a displaceable control device or valve head structure indicated generally at 35, the valve head being supported or carried by a valve stem or rod 36 which as here shown, is supported for reciprocal displacement by a sleeve or bushing element 38, preferably formed as an integral part of the valve body 26. The free end portion 39 of the stem is extended beyond the bushing, and has suitably mounted thereon a disc 40 against which bears one end of a compression type valve spring 42, the opposite spring end being disposed against the face 43 of the valve body. As will now appear, the spring 42 serves to urge the valve stem, and hence the valve head 35, in one direction such as to effect closure of the passage 30 by the valve head 35. Passage-opening displacement of the valve head, effected through its stem 36, may be attained by any appropriate means which is capable of selectively varying the extent of opening movement or lift of the head 35 relative to the valve seat 31 and hence to the port-margin 32, provision for varying the extent of valve-opening being a prerequisite herein to the proper flow control function of the presently improved valve assembly, as will appear hereinafter. Valve actuating means of a character suitable for this purpose, is fully disclosed as to one form, by my copending application Serial No. 401,884, filed July 11, 1941, and entitled Gas engines, this being the application hereinbefore referred to, and as to another form presenting a valve-actuator of a hydraulic character, by my copending application Serial No. 486,192 filed May 8, 1943, and entitled Hydraulic operation of mechanism. Either of the actuators shown by the above referred to applications, is especially suitable for operating the presently improved valve mechanism to vary the valve-lift for the purposes of the present invention, and hence either may be considered as incorporated herein by reference. However, any other character of valve operating means functioning as above indicated, may be employed as desired, such as the simplified engine-governor controlled actuator mechanism illustrated diagrammatically in Fig. 1. As there shown, a rocker arm 46 pivoted at 47 upon a fixed standard 48 which may be mounted (not shown) upon the cylinder head 11, bears at one end through a roller 50, upon the upper end 39 of the valve stem 36. Adjustably secured to the other end of the rocker is a rocker operating rod 51 having suitably journalled at its lower end, a cam-follower or roller 52, the rod being retained for longitudinal displacement, in suitable bearings or the like (not shown). The engine camshaft represented in part at 54 and which may be gear- or chain-driven, or otherwise suitably actuated from a rotating part of the engine, as the engine crankshaft (not shown), carries a shaft element 55 sleeved thereon and secured as by keys or splines (not shown) for rotation with the camshaft, the element 55 however, being capable of displacement longitudinally of the camshaft through its splined connection. Mounted upon the shaft element 55 is a cam 56 formed to provide a cam lobe 58 presenting a surface inclined in the axial direction as illustrated. It thus will appear that by varying the position of the sleeve shaft 55 and its cam 56 longitudinally of the camshaft, a higher or lower portion of the cam lobe 58 will during cam rotation, underlie and hence act upon the cam follower 52 to effect a corresponding greater or lesser displacement of the rod 51. The resulting actuation of the rocker arm 46 produces a corresponding greater or lesser displacement or lift of the valve stem 36 and valve head 35.

Control of cam positionment may be attained by any suitable means preferably responsive to fluctuations in engine speed and loading, so as to vary the valve lift, and hence to regulate or meter the fuel admitted to the cylinder in a manner hereinafter to appear, in proportion to the engine speed and load obtaining at any given time. As here indicated, such means is represented by an engine-driven governor device 59 operative through a pivoted lever 60 having a yoke or other connection to the shaft element 55, to determine the longitudinal placement of the cam 56 relative to the follower 52. It may be noted here that the timing of valve lift as well as the duration of valve opening and the timing of its closure, relative to engine crankshaft rotation and hence piston displacement, may be predetermined for each operative position of the cam 56 longitudinally relative to the follower 52, by appropriate design and formation of the cam lobe 58, as such is fully disclosed in application Serial No. 401,884, referred to above.

Continuing now with a description of the novel form and construction of the valve head 35, it will appear that the head includes a passage-closing portion 62 circumferentially bevelled as shown, to adapt the same for seating on the bevelled seat portion 31 of the discharge passage 30, whereby effectively to close the passage. Connecting the head portion 35 and the inner end 63 of the valve stem 36, is a stem section 64 the inner or upper portion 66 of which is relatively reduced as shown. The portion 67 of the stem section between the reduced portion 66 thereof and the portion 62, is of an enlarged, outwardly bevelled character substantially in the form of a conical frustum, and is adapted for cooperation with the port-margin 32 in the passage-opening displacement of the valve head, to regulate fluid or gas flow through the port in a manner presently to appear. Forwardly on the head 35 is a plate-like cap or deflector element 68 which projects to a predetermined but substantial extent, laterally of the head 35. Although indicated as integral with the valve head, the deflector element if desired, may be provided as a separate part and suitably secured in assembly to the valve head. The purpose of the deflector element will appear presently.

Fig. 2 illustrates the valve in closed position as effected by the spring 42, wherein the head portion 62 is seated against the valve seat 31 to close the passage 30, while Fig. 3 shows the valve head 35 displaced to an initial or intermediate open position, and Fig. 4 illustrates the valve head in about its maximum open position. Referring first to Fig. 3, the valve head as displaced to an intermediate open position substantially as shown, has the base portion of the frusto-conical element 67 projected through the discharge port-margin 32 for cooperation therewith to define an effective port opening of annular extent and predetermined area, about the element 67 and in a plane normal to the tapered surface of the latter, between the fixed port-margin 32 and the inclined or tapered surface portion in the zone indicated at 70 near the base portion of the element 67. Opening displacement of the valve head 35 as effected by a valve actuator mechanism (such as that shown diagrammatically in Fig. 1) acting through the stem 36 and controlled to effect valve head lift only to the extent as shown in Fig. 3 for example, thus positions the tapered port-control element 67 of the valve head, relative to the fixed port-margin 32 to determine an effective port-opening of a predetermined area or capacity, as above described.

Regulation of the valve actuator mechanism through response of the governor 59 to engine speed and load conditions, such as to effect say, a greater extent of valve displacement or increased valve lift, as for example, to position the valve head 35 near its full open position, as indicated in Fig. 4, thereby relates the narrow inner end portion of the frusto-conical control element 67 with the port-margin 32. The effective port-opening thus established in a plane normal to the tapered surface of element 67, between the fixed port-margin 32 and the tapered surface portion indicated at 71 (Fig. 4) on the inner convergent end of the element, is now of substantially greater area or capacity relative to that obtaining with the valve head positioned as shown by Fig. 3. It is to be noted here that in the given valve assembly, an effective port-opening of maximum area or greatest capacity, is determined by valve head displacement or lift to an extent sufficient to dispose the innermost end 72 of the control element 67, being that end thereof which merges into the stem portion 64, opposite the fixed port-margin 32 and in a plane normal to the tapered surface of the control element.

From the foregoing, it now will appear that by varying the lift of the valve head 35 in the operation of the valve, the effective port-opening determined by the coaction of the tapered control element 67 on the valve head 35, and the fixed port-margin 32 in the manner described, may be correspondingly varied in its area or capacity, as between an opening of a predetermined minimum area obtained by coaction of the margin 32 and the base of the frusto-conical element 67, and an opening of substantially maximum area obtained by similar coaction of the margin 32 and the inner end 72 of the element 67. The valve head port-control element 67 thus functions as a flow throttling device, to predetermine in accordance with the extent of valve lift, the quantity or volume per unit of time, of fluid or gas flow through the port-opening. It may be noted further that by providing for periodic or impulse actuation of the valve head 35, the control element 67 will serve to meter fluid or gas flow through the discharge port-opening, as by regulating the quantity of fluid or gas discharged in each cycle of valve operation, in accordance with the extent and duration of valve lift in each cycle. Also, it will be appreciated that by forming the frusto-conical control element 67 so as to have a greater or lesser angle of taper relative to the longitudinal axis of the valve head 35, the rate of change in the area of the effective port-opening per unit of valve head displacement, resulting upon variations in the extent of valve lift, may be thus correspondingly predetermined.

Referring now to the function of the deflector cap element 68 in the presently improved valve assembly, it will be observed from Fig. 2 that in the passage-closed position of the valve head 35, the cap is somewhat spaced from the end wall surface 74 of the valve body. Upon opening displacement of the valve head, as to the intermediate open position thereof indicated in Fig. 3 for example, the cap element 68 displaced therewith forwardly from the valve wall surface 74, then cooperates with the surface 74 to direct fluid or gas discharged from chamber 27 through the effective port-opening determined as herein described, outwardly and laterally in a radial direction from the axis of the valve head 35. The fluid or other gas from the valve is thus materially diffused or spread uniformly about the valve head 35, for discharge therebeyond substantially in a direction normal to the valve axis. In this connection, it may be noted that the valve head portion 67 by reason of its outwardly tapered surface, assists the cap element 68 in the directioning of the fluid discharge, in its passage through the port-opening and beyond the valve head.

With particular reference to Fig. 1, it will be observed that through the action of the deflector cap element 68 upon valve admission of fuel to the cylinder, the fuel so admitted is distributed over the upper zone of the combustion space 12 such as to form a fuel stratum across the combustion space, extending to the ignition terminals of the spark plugs 18. While the stratification of fuel in the cylinder is but temporary, since in the instance of a gaseous fuel in particular, the gas combines or diffuses almost immediately with the combustion air charge existing in the cylinder, nevertheless, at the instant of fuel valve closure followed by fuel combustion, a fuel stratum is present as described, extending to the spark plug terminals, hence to the immediate region of incipient ignition. Such fuel stratification is facilitated further, by timing fuel admission in the cycle of engine operation, so that it occurs when the combustion space is fully confined except for the fuel admission opening, as for example, closing the exhaust eduction ports 16 in advance of fuel introduction.

The fuel valve 20 in its function to admit metered charges of fuel to the cylinder as regulated responsively to fluctuations in engine speed and loading, together with the provision for supplying to the valve, fuel under a predetermined pressure which is substantially constant for all engine load conditions, and the further action of the valve to effect stratification of fuel in its admission to the cylinder combustion space, with the fuel stratum extending to the zone or zones of incipient ignition, increases engine efficiency and provides a much more favorable coefficient of speed fluctuation by affording an improved manner of fuel introduction to the cylinder such as to assure positive fuel ignition, and a more uniform and effective fuel-charge combustion within the cylinder under any and all engine speed and load conditions to which the engine may be subject. Thus the presently improved method of and means for attaining fuel introduction to an engine cylinder, as now described, fully attains the objects first stated herein as well as others now readily apparent, and while of general utility in connection with internal combustion engines of various types, is especially applicable to gas engines operating on true gaseous fuels, one example of the latter being an engine of the character disclosed in my copending application for Gas engines, Serial No. 401,884, referred to hereinbefore.

While I have illustrated and described herein but one preferred embodiment of my invention, it is to be understood that the presently disclosed method of cylinder fuel introduction and the apparatus for accomplishing the objects of the invention, may be modified without departing from the spirit and full intended scope of the invention, as hereinafter claimed.

I claim as my invention:

1. The described method of introducing fuel to an engine cylinder, which consists in establishing and maintaining independently of engine speed, the pressure of a fuel available to the cylinder for timed admission thereto, at a relatively constant predetermined pressure value, and so distributing the fuel within the cylinder as to form a stratum thereof across the cylinder combustion space and in the immediate region of incipient ignition therein.

2. The described method of introducing fuel to an engine cylinder, which consists in maintaining throughout engine operation, a relatively constant pressure of fuel available to the cylinder, in admitting to the cylinder a metered charge of fuel, timed to occur while the cylinder is fully confined except for a fuel admission opening, and so distributing the fuel within the cylinder as to form a stratum thereof across the combustion space in the upper region thereof, extending to the region of incipient ignition therein.

3. The combination in an internal combustion engine, of a cylinder providing a combustion space, a piston operable in the cylinder, a fuel valve arranged in the cylinder for controlling fuel admission to the combustion space, means affording a supply of engine fuel, a conduit extending from said supply for the delivery of fuel under pressure to said valve, a pressure-control device in said conduit said pressure control device being of a character to maintain the pressure of the fuel delivered to said valve at a relatively constant, predetermined pressure value under all conditions of engine loading, and means in the cylinder combustion space and in the path of fuel flow through said valve, effective to deflect the fuel upon its admission to the combustion space, into a defined cylindrical stratum in said space.

4. The combination in an internal combustion engine, of a cylinder providing a combustion space, a piston operable in the cylinder, a fuel valve arranged in the cylinder for controlling fuel admission to the combustion space, means affording a supply of engine fuel, a conduit extending from said supply for the delivery of fuel under pressure to said valve, a pressure-control device in said conduit, fluid eduction means for said combustion space, arranged and adapted to be closed to said space during cylinder fuel admission by said valve, and means in the cylinder combustion space, and located in the path of fuel flow through said valve, effective to deflect the fuel upon its admission to the combustion space, into a defined cylindrical stratum in said space.

5. In an internal combustion engine, a cylinder providing a combustion space, a piston operable in the cylinder, a fuel valve arranged in the cylinder, valve-actuating and control means, including a governing device responsive to an engine operating condition, for regulating the actuating means to provide for variations in the timing and duration of valve actuation to admit fuel to the combustion space, means providing a source of engine fuel, conduit means for delivering fuel under pressure from said source to the fuel valve, a pressure-control device in said conduit means, means effective upon cylinder admission of fuel by said valve, to deflect the fuel into a defined cylindrical stratum in the cylinder combustion space, and electric ignition means arranged in the zone of the cylinder combustion space occupied by said fuel stratum.

6. In an internal combustion engine, a cylinder providing a combustion space, a piston operable in the cylinder, a fuel valve arranged in the cylinder for the admission of fuel to the combustion space, said valve being adapted to admit fuel in metered quantity, determined by the extent of valve opening displacement and the duration of valve opening, valve actuating means, including a governing device responsive to an engine operating condition, for regulating the actuating means to provide for variations in the extent and duration of valve opening, and means effective in any open position of the fuel valve to deflect the fuel admitted to the combustion space, into a defined cylindrical stratum therein.

7. In an internal combustion engine, a cylinder providing a combustion space, a piston operable in the cylinder, a fuel valve arranged in the cylinder for the admission of fuel to the combustion space, said valve being adapted to admit fuel in metered quantity, determined by the extent of valve opening displacement and the duration of valve opening, valve actuating and valve control means, including a governing device responsive to engine load, for regulating the actuating means to provide for variations in the extent and duration of valve opening, means affording a source of engine fuel, conduit means for delivering fuel under pressure from the source to said valve, a pressure-control device in said conduit means effective to maintain the fuel delivered to the valve, at a predetermined, relatively constant pressure, and means effective in any open position of the fuel valve, to deflect the fuel admitted to the combustion space, into a defined cylindrical stratum therein.

8. In an internal combustion engine, a cylinder providing a combustion space, a piston operable in the cylinder, a fuel valve arranged in the cylinder for the admission of fuel to the combustion space, said valve being adapted to admit fuel in metered quantity, determined by the extent of valve opening displacement and the duration of valve opening, valve actuating means and connected control means, including a governing device responsive to an engine operating condition, for regulating the actuating means to provide for variations in the extent and duration of valve opening, fluid eduction means for said cylinder combustion space, arranged and adapted to be closed to said space during cylinder fuel admission by said valve, means effective in any open position of the fuel valve, to deflect the fuel admitted to the combustion space, into a defined cylindrical stratum therein, and electric ignition means arranged in the zone of the cylinder combustion space occupied by said fuel stratum.

9. In an internal combustion engine, a cylinder providing a combustion space, a piston operable in the cylinder, a fuel valve arranged in the cylinder for the admission of fuel to the combustion space, said valve being adapted to admit fuel in metered quantity, determined by the extent of valve opening displacement and the duration of valve opening, valve actuating and controlling means, including a governing device responsive to an engine operating condition for regulating the actuating means to provide for variations in the extent and duration of valve opening, means affording a source of engine fuel, conduit means for delivering fuel under pressure from the source to said valve, a pressure control device in said conduit means, effective to maintain the fuel delivered to the valve, at a predetermined, relatively constant pressure, fluid eduction means for said cylinder combustion space, arranged and adapted to be closed to said space during cylinder fuel admission by said valve, and means effective in any open position of the fuel valve, to deflect the fuel admitted to the combustion space, into a defined cylindrical stratum therein.

10. The combination in an internal combustion engine providing a cylinder having a combustion space and a piston operable in the cylinder, a fuel valve arranged in the cylinder for controlling fuel admission to the combustion space, means affording a supply of engine fuel under pressure, a conduit for delivering fuel from the supply to said valve, a pressure-control device in said conduit, effective to maintain a relatively constant, predetermined pressure of fuel delivery to the valve, said fuel valve including a fuel admission passage extending to the cylinder combustion space, and a displaceable valve member in control of said passage, adapted to effect upon passage-opening displacement thereof, a port-opening in said passage of an effective area variable according to the extent of said valve displacement, whereby to vary the rate of fuel admission by said valve at said constant pressure, and valve-actuating means, including a governing device responsive to an engine operating condition, for regulating the actuating means to provide for variations in the extent of passage-opening displacement of said valve member.

11. In a valve assembly of the character described, a valve body providing a chamber therein and a discharge passage through a wall of the body, and a valve member of poppet type, in control of said passage, said valve member being displaceable in the passage-opening direction to a variable extent, and being adapted for cooperation with a portion of said passage to define in said passage, a port-opening of an effective area determined by said member according to the extent of passage-opening displacement thereof.

12. In a valve assembly of the character described, a valve body forming a valve chamber therein and providing a discharge passage for said chamber, extending through a wall of the body, a reciprocable valve member in control of said passage, means for urging said member in a direction to close said passage, said member being displaceable in the opposite or passage-opening direction to a selectively variable extent, and a control element carried by said valve member and positionable in said passage responsively to passage-opening displacement of said valve member, adapted to define a port-opening in the passage, of an effective area determined by the extent of passage-opening displacement of said valve member.

13. In a valve assembly of the character described, a valve body providing a valve chamber therein and a discharge passage through a wall of the chamber, a reciprocable valve member in control of said passage, means for urging said member in a direction to close said passage, said member being displaceable in the opposite or passage-opening direction to a selectively variable extent, and a control element having an inclined control surface, positionable relative to said passage in response to passage-opening displacement of said valve member, for cooperation with said passage to define therein, a port-opening of an effective area variable in accordance with the extent of passage-opening displacement of said valve member.

14. In a valve assembly of the character described, a valve body providing a valve chamber and a discharge passage through a wall of the chamber, the passage being formed to provide a port-margin therein, a reciprocable valve member in control of said passage, yieldable means serving to urge said member in the direction to close the passage, said member being displaceable in the opposite or passage-opening direction to a selectively variable extent, and a control element providing a substantially frusto-conical control surface, positionable in said passage responsively to passage-opening displacement of said valve member, and cooperating with said port-margin to define therewith a port-opening of an effective area determined in accordance with the extent of passage-opening displacement of said valve member.

15. In a valve assembly of the character described, a valve body providing a valve chamber therein and a discharge passage through a wall of the chamber, said passage being formed near one end to provide a valve seat defining a port-margin within the passage, a reciprocable valve member, yieldable means serving to urge said valve member in the direction to seat the member on said valve seat for closing said passage, said valve member being displaceable in the opposite or passage-opening direction to a selectively variable extent, and a tapered control element on said valve member, positionable relative to said port-margin upon passage-opening displacement of the valve member, said control element cooperating with said margin to define a port-opening in said passage, of an effective area determined by the control element in accordance with the extent of passage-opening displacement of said valve member.

16. In a fluid control valve of the character described, a valve body providing a chamber therein for the reception of fluid, and a discharge passage through a wall of the chamber, said passage having a predetermined diameter, a valve member movable to and from a position of passage-closure, and a deflector disc on said valve member, arranged transversely of said passage and having a diameter substantially greater than the diameter of the passage, whereby the disc overlaps the passage to a substantial extent, said deflector disc being effective upon movement of the valve member to a passage-opening position, to deflect and direct fluid issuing from said passage, outwardly therefrom and substantially radially of said deflector disc.

HENRY SCHRECK.